Sheet 1—2 Sheets.
Hammer & Chadwick,
Wash Boiler,
No. 82,713.      Patented Oct. 6, 1868.
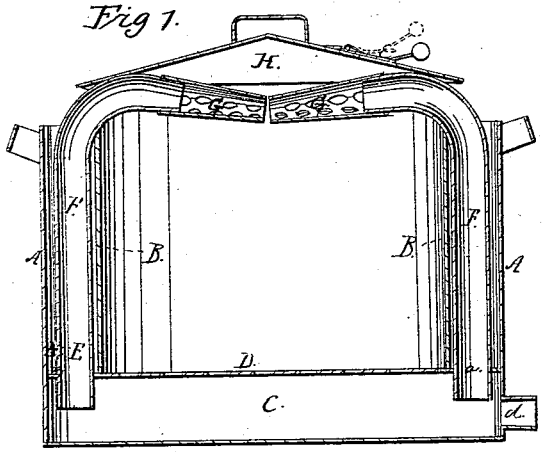
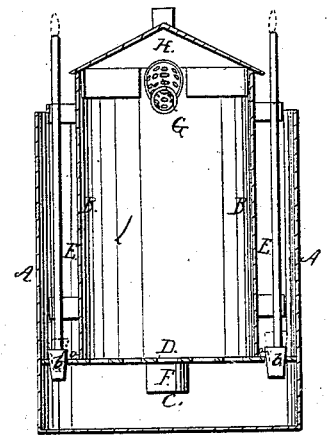
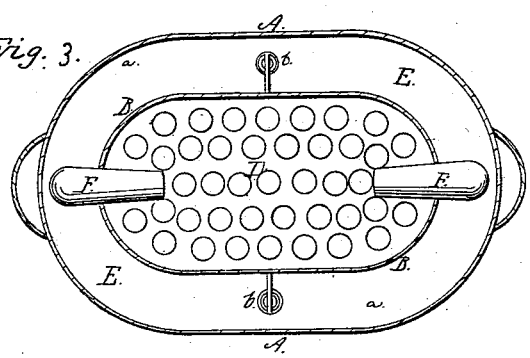
Witnesses:
Cornelius Cox
Leopold Emery
Inventor:
J. A. Hammer
per Thomas Chadwick
Alexander Mason
Attys.

Sheet 2-2 Sheets.
Hammer & Chadwick,
Wash Boiler,
Nº 82,713.     Patented Oct. 6, 1868.
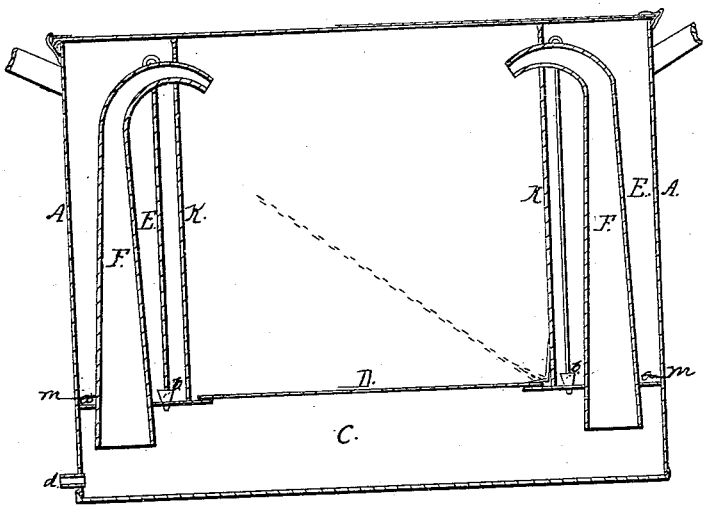
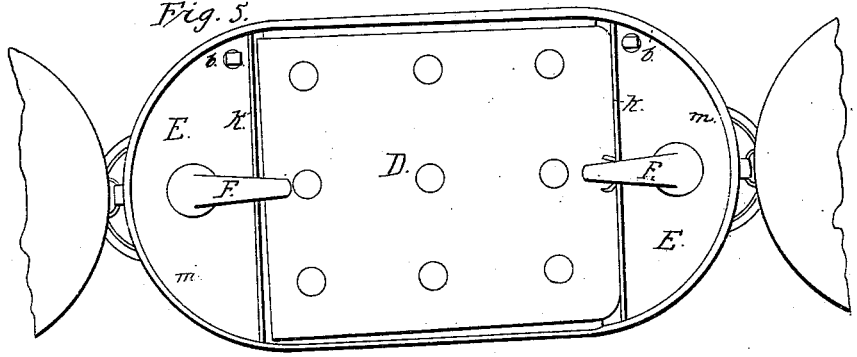

United States Patent Office.

J. A. HAMMER AND THOMAS CHADWICK, OF NEWTON, IOWA.

Letters Patent No. 82,713, dated October 6, 1868.

IMPROVEMENT IN WASH-BOILERS.

*The Schedule referred to in these Letters Patent and making part of the same.*

TO ALL WHOM IT MAY CONCERN:

Be it known that we, J. A. HAMMER and THOMAS CHADWICK, of Newton, in the county of Jasper, and State of Iowa, have invented certain new and useful Improvements in "Automatic Clothes-Washers;" and we do hereby declare that the following is a full, clear, and exact description thereof, reference being had to the accompanying drawings, and to the letters of reference marked thereon.

The nature of our invention consists in an improvement in clothes-washers, for the purpose of more thoroughly cleansing clothes with greater ease and convenience than by any other process known in all other boilers on a similar principle.

If it is desired to renew the water after it becomes filthy from the dirt extracted from the clothes, it is necessary, in the ordinary boilers, to take the clothes out of the boiler, and either put clean cold water in, or have an extra pot or kettle on the fire for the purpose of keeping a supply of hot water to renew with, and then have to put the clothes back again, a work of labor, besides having to handle the hot clothes more than is necessary.

All this is obviated by our "clothes-washer," which has several chambers, a lower one or boiling-chamber, one upper, or clothes-chamber, and one or more heating and supply-chambers, all combined in one machine.

The dirty water may be drawn off from the lower or boiling-chamber, and clean hot water be inserted in its place from the supply-chamber at a moment's notice, and the process repeated as often as desired, without removing the clothes, thereby not only being able to wash them well, but to rinse them thoroughly in one operation, without removing them from the boiler.

In order to enable others skilled in the art to make and use our invention, we will now proceed to describe its construction and operation, referring to the annexed drawings, which form a part of this specification, and in which—

Figure 1 is a sectional side view,

Figure 2 a sectional end view, and

Figure 3 a plan view, all showing one supply-chamber around the clothes-chamber; and Figure 4 is a sectional side view, and Figure 5 a plan view, showing one supply-chamber at each end of the clothes-chamber.

We take a common wash-boiler, A, of any desired shape, such as are in general use, with a solid flat bottom, in which we insert another boiler, B, of such size as shall leave a space between the inner and outer boiler.

The bottom of the inner boiler, B, is so constructed as to have a flange, a, projecting all around, sufficient to fit in the outer boiler, A, and is securely fastened and made tight to the same at a suitable distance from its bottom, thus leaving a space, C, between the bottoms.

That portion of the bottom, D, of the inner boiler, B, seen from the inside, is perforated with holes, as seen in fig. 3. Its flange a is tight, and forms the bottom of the outer chamber or reservoir, E.

In the bottom of this chamber or reservoir are placed holes and valves, b b, which can be opened or shut at pleasure from the top of the boiler, for the purpose of letting down water from the reservoir into the boiling-chamber C.

We also have one, two, or more curved tubes, F, which may be placed at the sides or end of the boiler, coming up in the reservoir E, between the sides of the inner and outer boilers. Their lower ends, which are open, are made to connect with the lower chamber, C, passing through the bottom of the reservoir or supply-chamber, to which they are tightly fastened, and about half way to the bottom of the lower chamber.

The upper ends of the tubes are curved over or near the top of the inside boiler, B, so as to point slightly downward, and into the same.

We have a perforated and open mouth-piece, G, which can be put on the ends of the tubes at will of the operator, for the purpose of more evenly distributing the water over the clothes, which are put on the perforated bottom D of the inside boiler, B.

These mouth-pieces are loose, and can be taken off at pleasure, for the purpose of more readily taking out or putting clothes in the boiler.

Through the side, and near the lower edge of the outer boiler, A, is a vent-hole, $d$, in which may be inserted a plug or faucet, for the purpose of drawing off the water from the lower or boiling-chamber C.

In the lid H to the inside boiler, B, is a valve, $e$, as shown, whereby the surplus steam may escape, thereby preventing it boiling over.

Instead of putting a smaller boiler inside of a larger, as above described, we may divide a common boiler, by partitions, K K, into several apartments.

The partition or partitions K, as there may be one or more, as is desired, are secured to the sides of the boiler A, a suitable distance from its bottom, forming, as before, one lower or boiling-chamber, one or more reservoirs or supply-chambers, and one chamber or apartment for the clothes.

This latter chamber is provided with a similar perforated bottom D, and instead of this bottom being secured to the partitions, it may be loose, resting on flanges at their lower edges, or hinged, as shown in fig. 4.

This will permit the bottom to be either raised up like a trap-door, or taken out altogether, for the purpose of cleaning out the lower chamber, or thoroughly drying it out after using, to prevent rust.

The bottom, $m$, of the chamber or chambers E is in this case formed of a plate fastened to the side of the boiler A, and the lower edge of the partition K, and extending into the clothes-chamber, so as to form the flange on which the perforated bottom D rests.

The operation is as follows:

Fill the lower chamber, C, with soap-suds up to or covering the bottom of the inner boiler; put about the same quantity in the reservoir E, the valves $b$ $b$ being closed; then put your clothes, having previously soaked them in water, in the inner boiler or clothes-chamber, put on the cover, and place the whole on the fire. The application of heat will in a short time cause the water and steam from the lower chamber, C, to find a vent through the tubes F F, leading therefrom, and so be discharged on top of the clothes in the clothes-chamber, causing a vacuum in the chamber C, which is supplied again by draining through the clothes from above. This process, by the steady application of heat, is kept up until the water has become too filthy to cleanse the clothes any more, when it is drawn off through the vent-hole $d$, and the clean water from reservoirs E E is let down by means of the valves $b$ $b$.

It will be evident that this water will be so hot, on account of the tubes F F conveying the hot water from chamber C, running up through it, and from the heating-surface of the clothes-chamber, that a few minutes' stay in the boiling-chamber will bring it to that point of heat that it will begin to flow through the tubes as before. This second water, acting in the capacity of a first-rinse water, will in a short time take out all the residue of dirt which may have been left in the clothes by the first water.

Having thus fully described our invention, what we claim as new, and desire to secure by Letters Patent, is—

1. A clothes-washer, so constructed as to form one lower or boiling-chamber, one clothes-chamber, and one or more reservoirs for supplying clean hot water, substantially as herein set forth.

2. A clothes-washer, constructed as described, with one or more reservoirs, connected by valves to the boiling-chamber below, which valves can be opened and closed at will from the top of the boiler, substantially as and for the purposes herein set forth.

3. Passing the steam-conducting-tubes of a wash-boiler, constructed as specified, through the water-reservoirs, for the purpose of heating the water contained therein, substantially as and for the purposes herein set forth.

4. In a clothes-washer, the combination of a clothes-chamber, boiling-chamber C, one or more reservoirs E, tubes F F, perforated mouth-pieces G G, perforated bottom D, and valves $b$, $d$, and $e$, all arranged as described, and operating substantially as and for the purposes herein set forth.

In testimony that we claim the foregoing, we have hereunto set our hands, this fourteenth day of July, 1868.

J. A. HAMMER.
THOS. CHADWICK.

Witnesses:
J. W. WILSON,
CHAS. S. KINGSLEY.